(12) United States Patent
Martin et al.

(10) Patent No.: US 7,331,045 B2
(45) Date of Patent: Feb. 12, 2008

(54) SCHEDULING TECHNIQUE FOR SOFTWARE PIPELINING

(75) Inventors: Allan Russell Martin, Toronto (CA); James Lawrence McInnes, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/835,129

(22) Filed: Apr. 29, 2004

(65) Prior Publication Data

US 2005/0034111 A1 Feb. 10, 2005

(30) Foreign Application Priority Data

Aug. 8, 2003 (CA) .................................... 2439137

(51) Int. Cl.
G06F 9/45 (2006.01)

(52) U.S. Cl. ..................................... 717/160; 717/159

(58) Field of Classification Search .......... 717/160–161
See application file for complete search history.

(56) References Cited

U.S. PATENT DOCUMENTS

| 4,989,131 A | 1/1991 | Stone .......................... 364/200 |
| 5,317,734 A | 5/1994 | Gupta ......................... 395/650 |
| 6,038,538 A | 3/2000 | Agrawal et al. ............... 705/7 |
| 6,311,265 B1 | 10/2001 | Beckerle et al. ............ 712/203 |

FOREIGN PATENT DOCUMENTS

| EP | 0481615 A2 | 9/1991 |
| EP | 0481615 A2 * | 4/1992 |
| JP | 7021144 | 4/1994 |

OTHER PUBLICATIONS

Alex Aleta, Josep M. Codina, Antonio Gonzalez and David Kaeli "Instruction Replication for Clustered Microarchitectures" 2003 IEEE.*
Nohbyung Park and Alice Parker "SEHWA: A Program for Synthesis of Pipelines" 1986 IEEE.*
Nohbyung park and Alice C Parker "Sehwa: A software Package for Synthesis of Pipelines from Behavioral Specifications" 1988 IEEE.*
Codina, J. et al. "A Comparative Study of Modulo Scheduling Techniques", ICS, pp. 97-106, New York, Jun. 22-26, 2002.
Sanchez, J. et al. "Instruction Scheduling for Clustered VLIW Architectures", ISSS 2000, IEEE 1080-1082, pp. 41-46, 2000.
Nitezki, P. "Exploiting Data Parallelism in Signal Processing on a Data Flow Machine", ACM 0884-7495/89/0000/0054, pp. 54-61, 1989.
Akturan, C. et al. "RS-FDRA: A Register Sensitive Software Pipelining Algorithm for Embedded VLIW Processors", ACM 1-58113-264-2/01/04, 2001.

(Continued)

Primary Examiner—Wei Zhen
Assistant Examiner—Phillip H Nguyen
(74) Attorney, Agent, or Firm—David Irvin; Winstead PC

(57) ABSTRACT

An improved scheduling technique for software pipelining is disclosed which is designed to find schedules requiring fewer processor clock cycles and reduce register pressure hot spots when scheduling multiple groups of instructions (e.g. as represented by multiple sub-graphs of a DDG) which are independent, and substantially identical. The improvement in instruction scheduling and reduction of hot spots is achieved by evenly distributing such groups of instructions around the schedule for a given loop.

2 Claims, 6 Drawing Sheets

OTHER PUBLICATIONS

Zhou, J. et al. "A DAG-Based Partitioning-Reconfiguring Scheduling Algorithm in Network of Workstations", IEEE Computer Society HPC-Asia 2000, 0-7695-0589-2/00, May 14-17, 2000, pp. 323-326.

Ling, Z. et al., "A Planning-Based Graph Matching Algorithm for Knowledge Structure Retrieval", Fourth ISPE International Conference, Technomic Publishing Co., Inc. pp. 223-230, Aug. 20-20, 1997.

* cited by examiner

```
          LABEL_1:
     ⎧ 1  LOAD  r100=x(r101,0)
     ⎪ 2  LOAD  r200=y(r102,0)
210 ⎨ 3  FMA   r300=r300,r100,r200
     ⎩ 4  STORE z(r103,0)=r300
     ⎧ 5  LOAD  r400=x(r101,4)
     ⎪ 6  LOAD  r500=y(r102,4)
220 ⎨ 7  FMA   r600=r600,r400,r500
     ⎩ 8  STORE z(r103,4)=r600
     ⎧ 9  LOAD  r700=x(r101,8)
     ⎪10  LOAD  r800=y(r102,8)
230 ⎨11  FMA   r900=r900,r700,r800
     ⎩12  STORE z(r103,8)=r900
     ⎧13  LOAD  r1000=x(r101,12)
     ⎪14  LOAD  r1100=y(r102,12)
240 ⎨15  FMA   r1200=r1200,r1000,r1100
     ⎩16  STORE z(r103,12)=r1200
250→17  ADD   r101=r101,16
260→18  ADD   r102=r102,16
270→19  ADD   r103=r103,16
         BCT   LABEL_1
```

— 200

```
301  set current sub-graph counter = 0
302  for (each node in graph)
303    if (node is not yet visited)
304      increment current sub-graph counter clear current sub-graph list
305      call recursively add nodes_to_sub-graph (this node)
306    end if
307  end for
308  function: recursively add nodes_to_sub-graph(node)
309    add node to current sub-graph list
310    add node to visited nodes list
311    for (each predecessor of node)
312      if (predecessor is not in current sub-graph list)
313        if (predecessor is marked as already visited)
314          signal an error because nodes in other sub-graphs should not be reachable
315        end if
316        call recursively add nodes_to_sub-graph (predecessor)
317      end if
318    end for
319    for (each successor of node)
320      if (successor is not in current sub-graph list)
321        if (successor is marked as already visited)
322          signal an error because nodes in other sub-graphs should not be reachable
323        end if
324        call recursively add nodes_to_sub-graph (successor)
325      end if
326    end for
327  end function
```

FIG. 3

| | Scheduler action: | Machine usage: |
|---|---|---|
| 401 | Put node 4 in cycle 8 using: | 1 load/store unit and 1 issue unit in cycle 0 |
| 402 | Put node 3 in cycle 4 using: | 1 arithmetic unit and 1 issue unit in cycle 5 |
| 403 | Put node 1 in cycle 0 using: | 1 load/store unit and 1 issue unit in cycle 4 |
| 404 | Put node 2 in cycle 0 using: | 1 load/store unit and 1 issue unit in cycle 0 |
| 405 | Put node 8 in cycle 8 using: | 1 load/store unit and 1 issue unit in cycle 1 |
| 406 | Put node 7 in cycle 4 using: | 1 arithmetic unit and 1 issue unit in cycle 0 |
| 407 | Put node 5 in cycle -1 using: | 1 load/store unit and 1 issue unit in cycle 5 |
| 408 | Put node 6 in cycle -1 using: | 1 load/store unit and 1 issue unit in cycle 1 |
| 409 | Put node 12 in cycle 9 using: | 1 load/store unit and 1 issue unit in cycle 1 |
| 410 | Put node 11 in cycle 5 using: | 1 arithmetic unit and 1 issue unit in cycle 0 |
| 411 | Put node 9 in cycle 1 using: | 1 load/store unit and 1 issue unit in cycle 5 |
| 412 | Put node 10 in cycle 1 using: | 1 load/store unit and 1 issue unit in cycle 1 |
| 413 | Put node 16 in cycle 9 using: | 1 load/store unit and 1 issue unit in cycle 2 |
| 414 | Put node 15 in cycle 5 using: | 1 arithmetic unit and 1 issue unit in cycle 1 |
| 415 | Fail to put node 13. | |

FIG. 4A

| Cycle | Node | Cycle | Node | Cycle | Node | Cycle | Node |
|---|---|---|---|---|---|---|---|
| -6 | | 0 | 1,2 | 6 | | 12 | |
| -5 | | 1 | 9,10 | 7 | | 13 | |
| -4 | | 2 | | 8 | 4,8 | 14 | |
| -3 | | 3 | | 9 | 12,16 | 15 | |
| -2 | | 4 | 3,7 | 10 | | 16 | |
| -1 | 5,6 | 5 | 11,15 | 11 | | 17 | |

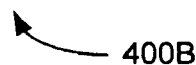

FIG. 4B

| | Scheduler action: | Machine usage: |
|---|---|---|
| 501 | Put node 4 in cycle 8 using: (node 4 is first node in sub-graph #0 of type 1, so place at cycle 8 + ceil((0)*(6)/4)= 8) | 1 load/store unit and 1 issue unit in cycle 2 |
| 502 | Put node 3 in cycle 4 using: | 1 arithmetic unit and 1 issue unit in cycle 4 |
| 503 | Put node 1 in cycle 0 using: | 1 load/store unit and 1 issue unit in cycle 0 |
| 504 | Put node 2 in cycle 0 using: | 1 load/store unit and 1 issue unit in cycle 0 |
| 505 | Put node 8 in cycle 10 using: (node 8 is first node in sub-graph #1 of type 1, so place at cycle 8 + ceil((1)*(6)/4) = 10) | 1 load/store unit and 1 issue unit in cycle 4 |
| 506 | Put node 7 in cycle 6 using: | 1 arithmetic unit and 1 issue unit in cycle 0 |
| 507 | Put node 5 in cycle 2 using: (Can't put node 6 in cycle 2 due to load/store usage of nodes 4 and 5) | 1 load/store unit and 1 issue unit in cycle 2 |
| 508 | Put node 6 in cycle 1 using: | 1 load/store unit and 1 issue unit in cycle 1 |
| 509 | Put node 12 in cycle 11 using: (node 12 is first node in sub-graph #2 of type 1, so place at cycle 8 + ceil((2)*(6)/4) = 11) | 1 load/store unit and 1 issue unit in cycle 5 |
| 510 | Put node 11 in cycle 7 using: | 1 arithmetic unit and 1 issue unit in cycle 1 |
| 511 | Put node 9 in cycle 3 using: | 1 load/store unit and 1 issue unit in cycle 3 |
| 512 | Put node 10 in cycle 3 using: | 1 load/store unit and 1 issue unit in cycle 3 |
| 513 | Put node 16 in cycle 13 using: (node 16 is first node in sub-graph #3 of type 1, so place at cycle 8 + ceil((3)*(6)/4) = 13) | 1 load/store unit and 1 issue unit in cycle 1 |
| 514 | Put node 15 in cycle 9 using: | 1 arithmetic unit and 1 issue unit in cycle 3 |
| 515 | Put node 13 in cycle 5 using: (Can't put node 14 in cycle 5 due to load/store usage of nodes 12 and 13) | 1 load/store unit and 1 issue unit in cycle 5 |
| 516 | Put node 14 in cycle 4 using: | 1 load/store unit and 1 issue unit in cycle 4 |
| 517 | Put node 17 in cycle 0 using: (node 17 is first node in sub-graph #0 of type 2, so place at cycle 0 + ceil((0)*(6)/3) = 0) | 1 arithmetic unit and 1 issue unit in cycle 0 |
| 518 | Put node 18 in cycle 2 using: (node 16 is first node in sub-graph #3 of type 1, so place at cycle 0 + ceil((1)*(6)/3) = 2) | 1 arithmetic unit and 1 issue unit in cycle 1 |
| 519 | Put node 19 in cycle 4 using: (node 16 is first node in sub-graph #3 of type 1, so place at cycle 0 + ceil((2)*(6)/3) = 4) | 1 arithmetic unit and 1 issue unit in cycle 1 |

500A FIG. 5A

| Cycle | Node | Cycle | Node | Cycle | Node | Cycle | Node |
|---|---|---|---|---|---|---|---|
| -6 | | 0 | 1,2,17 | 6 | 7 | 12 | |
| -5 | | 1 | 5 | 7 | 11 | 13 | 16 |
| -4 | | 2 | 6,18 | 8 | 4 | 14 | |
| -3 | | 3 | 9,10 | 9 | 15 | 15 | |
| -2 | | 4 | 3,14,19 | 10 | 8 | 16 | |
| -1 | | 5 | 7,13 | 11 | 12 | 17 | |

500B FIG. 5B

SCHEDULING TECHNIQUE FOR SOFTWARE PIPELINING

BACKGROUND

The present invention relates generally to computer systems and programs, and more specifically to an improved scheduling technique for software pipelining.

Software pipelining is a compiler optimization technique for reordering hardware instructions within a given loop of a computer program being compiled, so as to minimize the number of cycles required to execute each iteration of the loop. More specifically, software pipelining attempts to optimize the scheduling of such hardware instructions by overlapping the execution of instructions from multiple iterations of the loop.

For the purposes of the present discussion, it may be helpful to introduce some commonly used terms in software pipelining. As well known in the art, individual machine instructions in a computer program may be represented as "nodes" having assigned node numbers, and the dependencies and latencies between the various instructions may be represented as "edges" between nodes in a data dependency graph ("DDG"). A grouping of related instructions, as represented by a grouping of interconnected nodes in a DDG, is commonly known as a "sub-graph". If the nodes of one sub-graph have no dependencies on nodes of another sub-graph, these two sub-graphs may be said to be "independent" of each other.

Software pipelining techniques may be used to attempt to optimally schedule the nodes of the sub-graphs found in a DDG. A well known technique for performing software pipelining is "modulo scheduling". Based on certain calculations, modulo scheduling selects a likely minimum number of cycles that the loops of a computer program will execute in, usually called the initiation interval ("II"), and attempts to place all of the instructions into a schedule of that size. Using this technique, instructions are placed in a schedule consisting of the number of cycles equal to the II. If, while scheduling, some instructions do not fit within II cycles, then these instructions are wrapped around the end of the schedule into the next iteration, or iterations, of the schedule. If an instruction is wrapped into a successive iteration, the instruction executes and consumes machine resources as though it were placed in the cycle equal to a placed cycle % (modulo operator) II. Thus, for example, if an instruction is placed in cycle "10", and the II is 7, then the instruction would execute and consume resources at cycle "3" in another iteration of the scheduled loop. When some instructions of a loop are placed in successive iterations of the schedule, the result is a schedule that overlaps the execution of instructions from multiple iterations of the original loop. If the scheduling fails to place all of the instructions for a given II, the modulo scheduling technique iteratively increases the II of the schedule and tries to complete the schedule again. This is repeated until the scheduling is completed.

As also known in the art, swing modulo scheduling ("SMS") is a specific modulo scheduling technique designed to improve upon other known modulo scheduling techniques in terms of the number of cycles, length of the schedule, and registers used. For a more detailed description of SMS, the reader is directed to a paper entitled "Lifetime-Sensitive Modulo Scheduling in a Production Environment" by Joseph Llosa et al., IEEE Transactions on Computers, Vol. 50, No. 3, March 2001, pp. 234-249. SMS has some distinct features. For example, SMS allows scheduling of instructions (i.e. nodes in a DDG) in a prioritized order, and it allows placement of the instructions in the schedule to occur in both "forward" and "backward" directions.

In certain situations, SMS and other known software pipelining techniques may fail to find an optimal schedule. In particular, finding the optimal schedule may be difficult when there are multiple groups of instructions (i.e. sub-graphs) which are independent, and substantially identical in structure (for example, this may result from "unrolling" a loop of a computer program where there are no dependencies between the unrolled iterations). Attempted scheduling of such independent, and substantially identical groups of instructions using known scheduling techniques may result in a cumulative bunching of instructions at various spots within the schedule. This can lead to less than optimal scheduling of loops in terms of the number of execution cycles (i.e. the II). Regions of high register pressure (i.e. register pressure hot spots) also may result.

Thus, an improved scheduling technique which may lower the number of cycles for execution and reduce register pressure hot spots would be desirable.

SUMMARY

The present invention provides an improved scheduling technique for software pipelining which is designed to find schedules requiring fewer processor clock cycles and reduce register pressure hot spots when scheduling multiple groups of instructions (e.g. as represented by multiple sub-graphs of a DDG) which are independent, and substantially identical. More specifically, the improvement in instruction scheduling and reduction of hot spots is achieved by evenly distributing such groups of instructions around the schedule for a given loop.

In an embodiment, repetitive, independent sub-graphs are first located in a computer program using a suitable sub-graph identification technique. Once the sub-graphs have been identified, a heuristic may be used to determine if the sub-graphs are substantially identical in structure. For example, the heuristic may analyse and compare the number of instructions, the cycle delays, and the length of a sub-graph.

In an embodiment, once the independent, substantially identical sub-graphs have been identified and grouped, the instructions contained in the sub-graphs may then be placed into a schedule at suitable calculated intervals to evenly distribute the instructions in those sub-graphs around the loops of the schedule. In an embodiment, this interval may be determined in dependence on the number of cycles available in a schedule, and the number of sub-graphs identified.

Using the above described scheduling technique, instructions may be more evenly distributed around the loop of the schedule so that they will compete for the same resources less often, in any given cycle in the schedule.

While particularly effective with the SMS technique mentioned above, the teachings of the present invention may be practiced with other software pipelining techniques to more evenly distribute the load of multiple, independent, substantially identical groups of instructions around the schedules for certain loops.

In a first aspect of the invention, there is provided a method of scheduling multiple groups of instructions in a computer program for execution on a processor, said processor being schedulable using a looped schedule, comprising:

(i) identifying independent, and substantially identical groups of instructions in said computer program;
(ii) counting the number of said groups of instructions identified in (i);
(iii) identifying a likely minimum number of cycles in which scheduling may be completed on said processor in said looped schedule;
(iv) calculating, in dependence upon the number of said groups of instructions counted in (ii) and said minimum number of cycles identified in (iii), a suitable starting cycle location in said looped schedule for each of said groups of instructions.

In an embodiment of the first aspect, (i) comprises identifying independent, substantially identical sub-graphs in a data dependency graph (DDG) corresponding to said computer program, said sub-graphs corresponding to said groups of instructions.

In another embodiment of the first aspect, (ii) comprises counting the number of independent, substantially identical sub-graphs of a given type.

In yet another embodiment of the first aspect, in (iii) said minimum number of cycles in which scheduling may be completed on said processor is calculated based on the number of independent, substantially identical sub-graphs of a given type counted in (ii), and based on maximum usage of operational performance characteristics of said processor.

In another embodiment of the first aspect, the method further comprises assigning sub-graphs of a given type a count number, beginning with 0, and calculating said suitable starting cycle location for each said sub-graph dependent upon the following function:

ceil((this sub-graph's count number)*(II)/(total number of sub-graphs of this type));

where "ceil(n)" rounds the value 'n' up to the nearest integer, and II is the likely minimum number of cycles in which scheduling may be completed on said processor in said looped schedule, as calculated in (iv).

In another embodiment, said calculating said starting cycle location for each said sub-graph is also dependent upon a sum of said ceil(n) function and an original starting cycle.

In a second aspect, there is provided a system for scheduling multiple groups of instructions in a computer program for execution on a processor, said processor being schedulable using a looped schedule, comprising:
(a) means for identifying independent, and substantially identical groups of instructions in said computer program;
(b) means for counting the number of said groups of instructions identified in (a);
(c) means for identifying a likely minimum number of cycles in which scheduling may be completed on said processor in said looped schedule;
(d) means for calculating, in dependence upon the number of said groups of instructions counted in (b) and said minimum number of cycles identified in (c), a suitable starting cycle location in said looped schedule for each of said groups of instructions.

In an embodiment of the second aspect, (a) comprises means for identifying independent, substantially identical sub-graphs in a data dependency graph (DDG) corresponding to said computer program, said sub-graphs corresponding to said groups of instructions.

In another embodiment of the second aspect (b) comprises means for counting the number of independent, substantially identical sub-graphs of a given type.

In another embodiment of the second aspect, in (c) said minimum number of cycles in which scheduling may be completed on said processor is calculated based on the number of independent, substantially identical sub-graphs of a given type counted in (b), and based on maximum usage of operational performance characteristics of said processor.

In yet another embodiment of the second aspect, the system further comprises means for assigning sub-graphs of a given type a count number, beginning with 0, and calculating said suitable starting cycle location for each said sub-graph dependent upon the following function:

ceil((this sub-graph's count number)*(II)/(total number of sub-graphs of this type));

where "ceil(n)" rounds the value 'n' up to the nearest integer, and II is the likely minimum number of cycles in which scheduling may be completed on said processor in said looped schedule, as calculated in (d).

In another embodiment of the second aspect, said means for calculating said starting cycle location for each said sub-graph is also dependent upon a sum of said ceil(n) function and an original starting cycle location set by another function.

In a third aspect, there is provided a system for scheduling multiple groups of instructions in a computer program for execution on a processor, said processor being schedulable using a looped schedule, comprising:
(a) a module for identifying independent, and substantially identical groups of instructions in said computer program;
(b) a module for counting the number of said groups of instructions identified in (a);
(c) a module for identifying a likely minimum number of cycles in which scheduling may be completed on said processor in said looped schedule;
(d) a module for calculating, in dependence upon the number of said groups of instructions counted in (b) and said minimum number of cycles identified in (c), a suitable starting cycle location in said looped schedule for each of said groups of instructions.

In a fourth aspect, there is provided a computer readable medium having computer readable program code embedded in the medium for scheduling multiple groups of instructions in a computer program for execution on a processor, said processor being schedulable using a looped schedule, the computer readable program code including:
(a) code for identifying independent, and substantially identical groups of instructions in said computer program;
(b) code for counting the number of said groups of instructions identified in (a);
(c) code for identifying a likely minimum number of cycles in which scheduling may be completed on said processor in said looped schedule;
(d) code for calculating, in dependence upon the number of said groups of instructions counted in (b) and said minimum number of cycles identified in (c), a suitable starting cycle location in said looped schedule for each of said groups of instructions.

an embodiment of the fourth aspect (a) comprises code for identifying independent, substantially identical sub-graphs in a data dependency graph (DDG) corresponding to said computer program, said sub-graphs corresponding to said groups of instructions.

In another embodiment of the fourth aspect, (b) comprises code for counting the number of independent, substantially identical sub-graphs of a given type.

In still another embodiment of the fourth aspect, in (c) said minimum number of cycles in which scheduling may be completed on said processor is calculated based on the number of independent, substantially identical sub-graphs of a given type counted in (b), and based on maximum usage of operational performance characteristics of said processor.

In another embodiment of the fourth aspect, the computer readable program code further comprises code for assigning sub-graphs of a given type a count number, beginning with 0, and calculating said suitable starting cycle location for each said sub-graph dependent upon the following function:

ceil((this sub-graph's count number)*(II)/(total number of sub-graphs of this type));

where "ceil(n)" rounds the value 'n' up to the nearest integer, and II is the likely minimum number of cycles in which scheduling may be completed on said processor in said looped schedule, as calculated in (d).

In still another embodiment of the fourth aspect, said code for calculating said starting cycle location for each said sub-graph is configured to calculate a sum of said ceil(n) function and an original starting cycle.

The foregoing and other aspects of the invention will be apparent from the following more particular descriptions of exemplary embodiments of the invention.

BRIEF DESCRIPTION OF THE DRAWINGS

In the figures which illustrate exemplary embodiments of the invention:

FIG. 3 is an illustrative example of pseudo-code which may be used for identifying substantially identical, independent machine instructions within the looped computer program of FIG.2.

FIG. 4A is an illustrative example of scheduling based on a known scheduling algorithm.

FIG. 4B is a schedule corresponding to the scheduling in FIG. 4A.

FIG. 5A is an illustrative example of scheduling based on an exemplary embodiment of present invention.

FIG. 5B is a schedule corresponding to the scheduling in FIG. 5A.

DETAILED DESCRIPTION OF EXEMPLARY EMBODIMENTS

Figure 1:
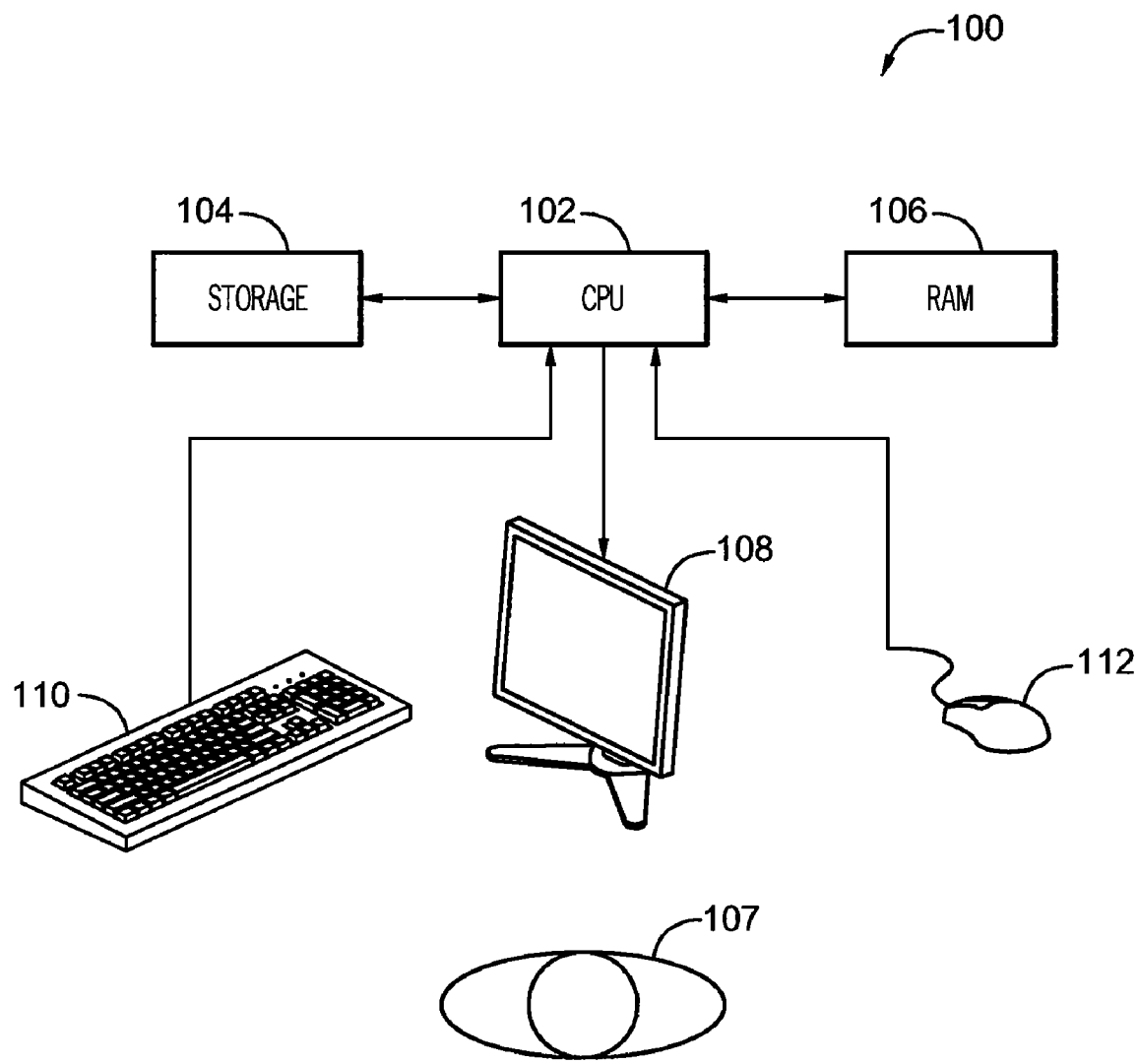
FIG. 1 is a schematic block diagram of a generic data processing system which may provide an operating environment for exemplary embodiments of the invention.

Referring to FIG. 1, shown is an exemplary data processing system 100 that may provide an operating environment for exemplary embodiments of the invention. The data processing system 100 may include a central processing unit ("CPU") 102 connected to a storage unit 104 and to a random access memory ("RAM") 106. A user 107 may interact with the data processing system 100 using a video display 108, and various inputs such as a keyboard 110 and mouse 112. The data processing system 100 of FIG. 1 is merely illustrative, and is not meant to be limiting in terms of the type of system that may provide a suitable operating environment for the invention.

Figure 2A:
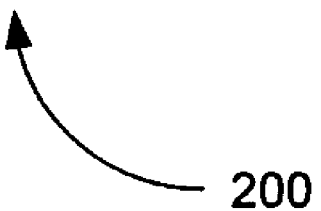
FIG. 2A is an illustrative example of a looped computer program.

FIG. 2A is an illustrative example of a looped computer program 200 which may execute, for example, on the CPU 102 of FIG. 1. In an embodiment, the user 107 (FIG. 1) may interact with a software process 160 configured in accordance with an exemplary embodiment of the present invention which may execute on CPU 102 (FIG. 1). The software process may be configured to compile the looped computer program 200 and schedule the instructions of the looped computer program 200 in accordance with an exemplary embodiment of the invention.

As shown, the looped computer program 200 may include a plurality of instructions, labeled at the left with assigned node numbers 1-19. As will be apparent to those skilled in the art, these node numbers may be used to represent each instruction as a node, and dependencies and cycle delays between the nodes may be shown in a DDG, such as that shown in FIG. 2B.

Figure 2B:
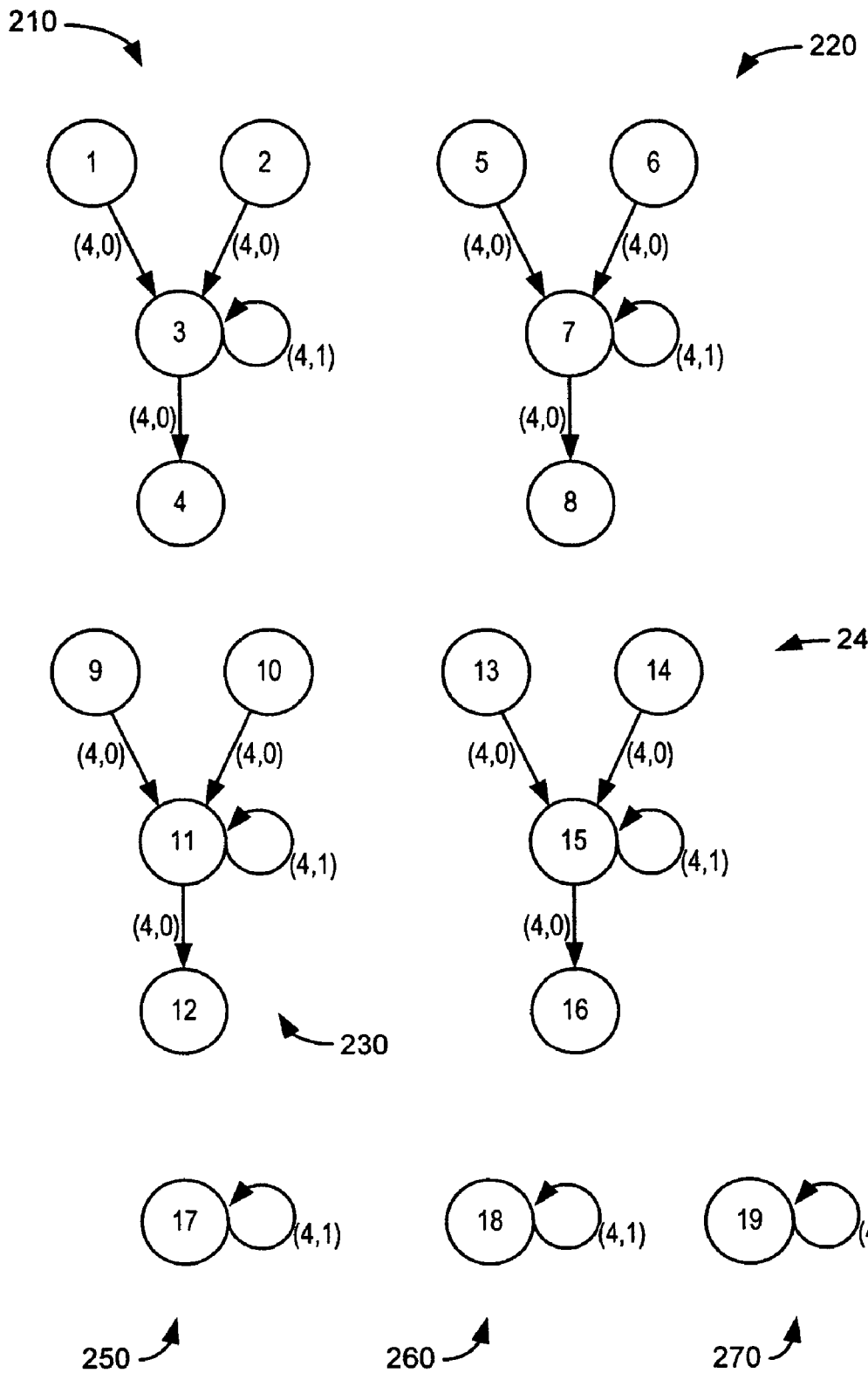
FIG. 2B is a DDG or data dependency graph corresponding to the looped computer program of FIG. 2A.

In FIG. 2B, it is shown that the looped computer program 200 includes a number of sub-graphs 210-240 of a first type. Each of the sub-graphs 210-240 includes two "LOAD" instructions, followed by an "FMA" (combined floating point multiply and add) instruction, and a "STORE" instruction. For example, referring to sub-graph 210, first and second LOAD instructions (nodes 1 and 2) are dependant upon an "FMA" instruction (node 3), as shown by the directional arrows, and the FMA instruction, in turn, is dependant upon a STORE instruction (node 4).

A "delay" and "distance" between nodes is shown adjacent each edge in bracket notation. For example, the edge between node 1 and node 3 has a notation "(4,0)" indicating a "delay" of 4 cycles, and a "distance" of 0. (In the present discussion, the term "delay" is used to describe a minimum number of cycles before another instruction may be executed. The delay may be caused by a number of factors, such as limited machine resources, and logical order of operation limitations. Also, the term "distance" is used to indicate the number of iterations that a dependence edge crosses. Thus, for example, if there is a dependence from node "i" to node "j" in the same iteration of a loop, the distance is zero. On the other hand, if there is a dependence from node "i" to node "j" in the next iteration of the loop, then the distance of that edge is one. Also, if there is a dependence from a node "i" onto itself in the next iteration of the loop, the distance is again one.)

Continuing with the example, the edge between node 2 and node 3 has the same delay and distance, as does the edge between node 3 and node 4. Node 3, on the other hand, has a delay onto itself with a notation "(4,1)" indicating a delay of 4 cycles and a distance of 1. Thus, there must be at least 4 cycles before node 3 can be scheduled again, and node 3 cannot be scheduled again in the current iteration of the loop.

Assuming that dependencies between the used base registers for LOAD/STORE instructions and the ADD instructions that update them can be ignored for scheduling purposes, there are four independent sub-graphs 210-240 having a substantially identical structure (the dependencies between updates and uses of base registers can be ignored on certain hardware platforms if the LOAD and STORE instructions form addresses by adding the base register to an immediate operand, allowing these instructions to be rewritten if they are reordered with an instruction that updates their base register by a known amount).

In addition to the sub-graphs 210-240, there are a number of smaller sub-graphs 250-270, each including a single "ADD" instruction. As shown in FIG. 2B, each of these sub-graphs 250-270 has a delay onto itself, notated as "(4,1)". Thus, there must be a delay of at least 4 cycles before each of these nodes can be scheduled again. Also, it is apparent that sub-graphs 250-270 are substantially identical in structure.

For the purposes of the present illustrative example, the four larger sub-graphs 210-240 may be assigned count numbers of #0, #1, #2, and #3, respectively, of a sub-graph "type 1". Also, the three small sub-graphs 250-270 may be assigned count numbers #0, #1, and #2 of a sub-graph "type 2".

In an embodiment, the sub-graphs 210-270 in the looped computer program 200 may be located using any one of a number of known sub-graph identification techniques. For example, FIG. 3 shows pseudo-code 300, as detailed in lines 301-323, which may be used for this purpose. (In an embodiment, such code may be embodied in a system module.)

Once all independent sub-graphs have been identified (for example by using the pseudo-code 300 of FIG. 3), additional information is needed to determine if some of these sub-graphs are substantially identical. It may often be the case that there will be identical sub-graphs as a result of unrolling a loop of a computer program, where no dependencies between the unrolled iterations exist. However, there can also be multiple sub-graphs if there are multiple independent computations being performed within an iteration of the loop. In this latter case, the independent sub-graphs may or may not be substantially identical.

There may be cases where a loop of a computer program has two or more independent computations that contain different sequences of instructions and, after unrolling and mapping into a DDG, there may be two or more groups of substantially identical, independent sub-graphs. For example, in the present illustrative example, sub-graphs 210-240 are of a first "type", and sub-graphs 250-270 are of a second "type". In an embodiment, a heuristic can be used to determine if the identified sub-graphs are identical. For example, such a heuristic may look at the sub-graph length (i.e. the difference in maximum and minimum height of all of the nodes in one sub-graph) and/or the number of instructions in a sub-graph.

Once the independent sub-graphs have been identified using a suitable heuristic, and it has been determined that at least some of the sub-graphs are substantially identical sub-graphs, scheduling of instructions from such sub-graphs may begin.

In an embodiment, a counter may be used for each group of sub-graphs so that it is known how many of a specific type of sub-graph need to have their first "node" scheduled. (In an embodiment, such a counter may be embodied in a system module.) Then, a suitable heuristic may be used to determine the cycle to start attempting to place the first node of each sub-graph. (An example of such a heuristic is discussed further below.) When the first node of a sub-graph of a first type is ready to be scheduled, the starting cycle for scheduling the instructions from that sub-graph can be calculated as follows:

Starting Cycle=starting cycle using original heuristic+ceil((this sub-graph's count number)*(II)/ (total number of sub-graphs of this type))    [1]

where the function "ceil(n)" rounds the value 'n' up to the nearest integer, and II is the initiation interval (In an embodiment, the above function may be embodied as part of a system module.)

Referring back to FIGS. 2A and 2B, as mentioned, there are four independent, substantially identical sub-graphs of a first type (sub-graphs 210-240) that consist of two LOADs feeding one FMA feeding one STORE. There are also three independent, substantially identical sub-graphs of a second type (sub-graphs 250-270) consisting of one ADD instruction each.

For the purposes of the present illustrative example, it has been assumed that the latency between all dependent instructions in the DDG chains is 4 cycles, from issue time to issue time. (In other words, once one instruction of a sub-graph has been scheduled in a particular cycle, the next instruction cannot be scheduled less than 4 cycles from that particular cycle.) Now, consider a hypothetical processor or CPU of a data processing system (e.g. CPU 102 of FIG. 1) that can issue four instructions per cycle for execution; execute two LOAD/STORE instructions per cycle (such as LOAD and STORE); and execute two arithmetic instructions per cycle (such as FMA and ADD). The "Minimum II", or the theoretical minimum number of cycles a loop can be executed, may then be calculated as follows:

Minimum II=max (RecII, ResII)    [2]

where RecII (or "Recurrence II")=the Minimum II due to the presence of recurrences in the DDG; and ResII (or "Resource II")=the Minimum II due to the maximum usage of data processing system resources (In an embodiment, this calculation may be embodied in a system module.)

Here, the RecII is found by finding the longest cycle of dependence edges. The ResII is found by finding the highest usage of a processor resource for the given set of instructions in the loop. Typical processor resources include execution units such as load/store or arithmetic units, or units that issue instructions each cycle. The exemplary machine we use has the capacity to issue 4 instructions per cycle, and execute 2 load/store instructions and 2 arithmetic instructions.

In the present illustrative example, as seen from FIG. 2B, the longest cycle of dependence edges is 4 cycles. Thus RecII=4 cycles.

The ResII can be determined from the following calculations:

Issue unit usage=19 instructions/4 instructions per cycle=4.75 cycles    [3]

Load/store unit usage=12 instructions/2 instructions per cycle=6 cycles    [4]

Arithmetic unit usage=7 instructions/2 instructions per cycle=3.5 cycles    [5]

It can be calculated that ResII=6 cycles. Thus, Minimum II=max (4,6)=6 cycles, and the theoretical minimum number of cycles this loop can be executed in is 6. This also requires the assumption that the closing branch of the loop is executed without cost, which is often true on certain modern hardware architectures.

Using the SMS technique introduced earlier, an SMS ordering phase could then generate a prioritized ordering of the nodes such as the following: 4, 3, 1, 2, 8, 7, 5, 6, 12, 11, 9, 10, 16, 15, 13, 14, 17, 18, 19. (As will be apparent, this prioritized ordering reflects a "backward" ordering of the nodes in sub-graph 210 (FIG. 2B), followed by a backward ordering of the nodes in each of the sub-graphs 220-240, followed by the nodes in each of the sub-graphs 250-270. In the ordering of sub-graph 210, as nodes 1 and 2 have the same distance from node 3, it will be appreciated that their ordering is interchangeable and arbitrary.) A scheduler could then produce a schedule, such as is shown in FIG. 4A (discussed below). Because this is modulo scheduling, instructions may be wrapped around the schedule so that cycles greater than 6 use machine resources in the cycle % 6 (where % is the modulo operator).

The possible advantages offered by the scheduling technique taught by the present invention may be seen more clearly in the following illustrative example.

EXAMPLE

Consider the illustrative scheduling process 400A in FIG. 4A. By way of example, this scheduling process 400A may be generated by using the SMS technique introduced above to schedule the looped computer program 200 of FIG. 2. As shown, the scheduling process 400A may comprise a plurality of "scheduler actions", labeled by reference numerals 401-415. Corresponding actual (i.e. physical) "machine usage" is shown to the right of each "scheduler action" 401-415.

More specifically, "machine usage" may be explained as follows. Consider a microprocessor having different resources available for use in each clock cycle. Typical types of resources available may include, for example, "issue" units, "arithmetic execution" units, and "load/store" units. If a loop contains certain instructions, then the number of resources required for executing the loop can be calculated. Then, for each resource available, the minimum execution time of the loop can be calculated by: min_time=(resources required by the loop)/(units of that resource available per cycle).

Results of each scheduler action 401-415 are shown in a corresponding schedule or "modulo reservations table" 400B, in FIG. 4B. For example, for scheduler action 401, "put node 4 in cycle 8", node 4 is placed accordingly, next to "cycle 8" in the modulo reservation table 400B. Since node 4 is the first node to be placed, some heuristic is needed to select a starting cycle. For example, the starting cycle may be selected based on the "earliest time" of node 4, as would be calculated in the paper by Llosa et al. (discussed above). This heuristic would also find the same starting cycle for nodes 8, 12, and 16, since they have the same earliest time property due to their similar relative position in their respective sub-graphs. The other instructions are placed relative to their previously scheduled predecessors and successors, such that all latencies of dependences are respected. In this example (in consequence of the ordering phase previously described), all of the nodes following starter nodes only have previously scheduled successors, so the scheduler actions are performed in the backward direction. Each of the scheduler actions 402-414, in turn, involve placing the next node in the ordering into their respective, specified cycles in the modulo reservations table 400B.

However, for action 415 of FIG. 4A, it is seen that the SMS technique has failed to schedule node 13. This is because: cycle 1 is full due to LOAD/STORE usage by nodes 9 and 10; cycle 0 is full due to LOAD/STORE usage by nodes 1 and 2; and cycle −1 is full due to LOAD/STORE usage by nodes 5 and 6. Cycles earlier than −1 are more than one iteration away from node 15, so in order to place node 13 there, the value in the register "r1000" would have to live for more than one iteration (this is not possible unless the hardware architecture has rotating registers or extra register copy instructions can be generated and placed in the schedule). Thus, the original SMS technique fails to schedule all of the instructions in 6 cycles.

In comparison, referring to FIG. 5A, now consider the scheduling process 500A using an improved scheduling technique in accordance with an illustrative embodiment of the present invention. As shown, the plurality of scheduler actions 501-519 has successfully generated a schedule in 6 cycles for this loop.

More particularly, node 4 is the first node in sub-graph #0 of type 1 (i.e. sub-graph 210 of FIG. 2). Using the Starting Cycle Function [1] as described above, node 4 is then calculated to be placed at "cycle 8+ceil ((0)*(6)/4)=8". Therefore, for scheduler action 501, "put node 4 in cycle 8", node 4 is placed next to "cycle 8" in the modulo reservation table 500B in FIG. 5B. Similarly, node 8 is calculated to be placed at "cycle 8+ceil ((1)*(6)/4)=10", so scheduler action 505 is "put node 8 in cycle 10". Similar interval calculations may be done, using the Starting Cycle Function [1], for each of the scheduler actions 509, 513, 517, 518, and 519, respectively.

Once all of the starting nodes have been scheduled, the remaining nodes are scheduled using the order derived from the previously described SMS ordering.

FIG. 5B shows a completed modulo reservation table 500B, corresponding to the instructions in the scheduling process 500A, with all of the instructions 501-519 successfully scheduled in 6 cycles.

Advantageously, scheduling the instructions using the improved scheduling technique in accordance with an embodiment of the invention allows the instructions to be successfully scheduled in 6 cycles, without having to use rotating registers, or generating register-copy instructions to prolong the lifetime of any registers. Furthermore, the instructions from the independent, substantially identical sub-graphs (i.e. sub-graphs 210-240, and sub-graphs 250-270 of FIG. 2) are more evenly spaced around the loops of the schedule (as represented in the modulo reservation table 500B in FIG. 5B) so that register pressure hot spots are significantly reduced. This is achieved by staggering the starting nodes.

The benefits of using the technique taught by the present invention may best be seen in more complex programs having many identical independent sub-graphs. However, virtually any software pipelining technique may benefit by the balanced load achieved by the present, improved scheduling technique.

While exemplary embodiments of the invention have been described, it will be apparent to those skilled in the art that various changes and modifications may be made.

Therefore, the scope of the invention is limited only by the following claims.

What is claimed is:

1. A method of scheduling multiple groups of instructions in a computer program for execution on a processor, said processor being schedulable using a looped schedule, comprising:

(i) identifying independent, and identical groups of instructions in said computer program;

(ii) counting the number of said groups of instructions identified in (i);

(iii) identifying a minimum number of cycles in which scheduling may be completed on said processor in said looped schedule;

(iv) calculating, in dependence upon the number of said groups of instructions counted in (ii) and said minimum number of cycles identified in (iii), a starting cycle location in said looped schedule for each of said groups of instructions;

wherein (i) comprises identifying independent, identical sub-graphs in a data dependency graph (DDG) corresponding to said computer program, said sub-graphs corresponding to said groups of instructions;

wherein (ii) comprises counting the number of independent, identical sub-graphs of a given type;

wherein in (iii) said minimum number of cycles in which scheduling may be completed on said processor is calculated based on the number of independent, identical sub-graphs of a given type counted in (ii), and based on maximum usage of operational performance characteristics of said processor, wherein the method further comprises:

assigning sub-graphs of a given type a count number, beginning with 0, and calculating said starting cycle location for each said sub-graph dependent upon the following function:

$$\mathrm{ceil}((\text{this sub-graph's count number})*(\text{initiation interval})/(\text{total number of sub-graphs of this type}));$$

where "ceil(n)" rounds the value 'n' up to the nearest integer, and said initiation interval is the minimum number of cycles in which scheduling may be completed on said processor in said looped schedule, as calculated in (iv).

2. The method of claim 1, wherein said calculating said starting cycle location for each said sub-graph is also dependent upon a sum of said ceil(n) function and an original starting cycle.

* * * * *